United States Patent [19]
Quirk

[11] 3,810,652
[45] May 14, 1974

[54] RUNNING GEAR

[76] Inventor: Jack M. Quirk, 1618 Gainsborough, Amarillo, Tex. 79106

[22] Filed: Oct. 25, 1972

[21] Appl. No.: 300,439

[52] U.S. Cl.............................. 280/125, 280/132
[51] Int. Cl............................................ B62d 1/02
[58] Field of Search........... 280/116, 132, 125, 140, 280/141, 113, 114, 513

[56] References Cited
UNITED STATES PATENTS
2,459,050   1/1949   Smith................................ 280/132
2,417,790   3/1947   Stockwell........................... 280/116
2,166,208   7/1939   Dayton............................... 280/513

*Primary Examiner*—Philip Goodman
*Attorney, Agent, or Firm*—Wendell Coffee

[57] ABSTRACT

On a swinging axle wagon or trailer, the front axle is articulated by ball socket joints rather than a flat fifth wheel. A bracket on the reach structure has a top and bottom socket connected by a torsion bar to stabilize the front axle. The bottom ball is vertically aligned with the top ball on the front axle.

11 Claims, 5 Drawing Figures

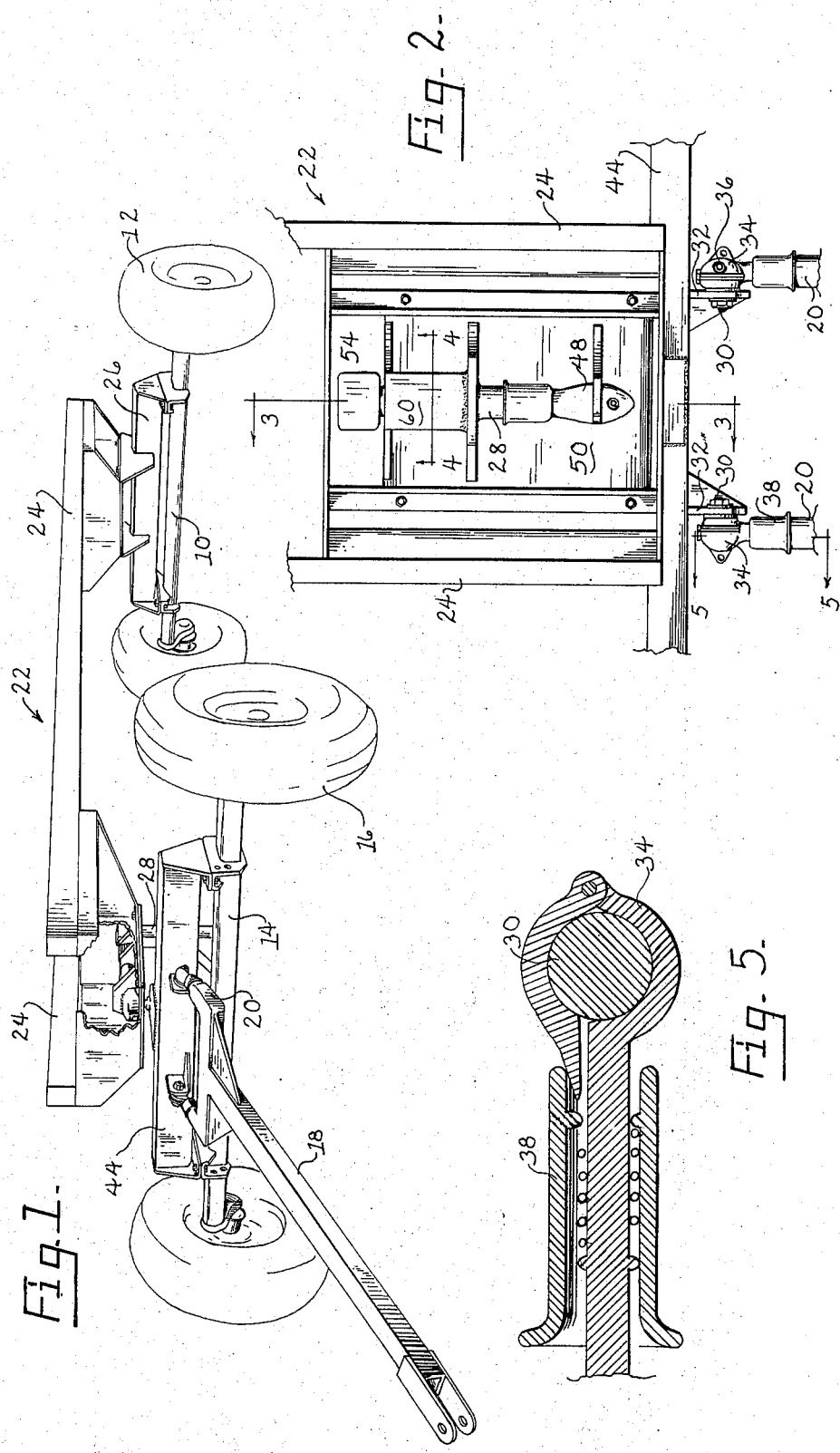

RUNNING GEAR

BACKGROUND OF THE INVENTION

1. Field of the Invention

This invention relates to the running gear of wheeled land vehicles and more particularly to a swinging axle or fifth wheel type trailer.

2. Description of the Prior Art.

At the present time, a great number of swinging axle trailers are used, both commercially and on the farm, e.g., to carry ammonia tanks for fertilizing. Particularly in agricultural use, the dust, dirt and grime is a source of constant trouble to the fifth wheel, the joint of the front axle to the reach structure and, also, the joint of the tongue to the front axle causes trouble.

When any play or slack gets in these joints, high speed towing is adversely affected. Also, they tend to lock in position, making them difficult to move.

SUMMARY OF THE INVENTION

New and Different Function.

I have solved these difficulties by replacing the fifth wheel with two vertically aligned ball and socket joints. The front axle swings freely, is stabilized, and the joints are readily lubricated. I use "bulldog" ball and socket joints as are commonly used on trailer hitches, which have a spring biased member so the socket always remains tight on the ball without excessive clearance or play.

Likewise, I have attached the tongue to the front axle by a pair of horizontally aligned ball and socket joints of the same bulldog type.

Therefore, I have provided a running gear for a trailer which has a longer life, is easier to use and is safe and efficient at high speeds.

Objects of this Invention.

An object of this invention is to provide a running gear for a farm wagon.

Other objects are to achieve the above with a device that is sturdy, compact, durable, lightweight, simple, safe, efficient, versatile, and reliable, yet inexpensive and easy to manufacture, install, and maintain.

Further objects are to achieve the above with a method that is versatile, rapid, efficient, and inexpensive, and does not require skilled people to install, adjust and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING:

FIG. 1 is a perspective view of a running gear of a wagon according to this invention.

FIG. 2 is a top plan view thereof particularly showing the front axle area.

FIG. 5 is a sectional view of a typical bulldog ball and socket joint.

Figure 3:
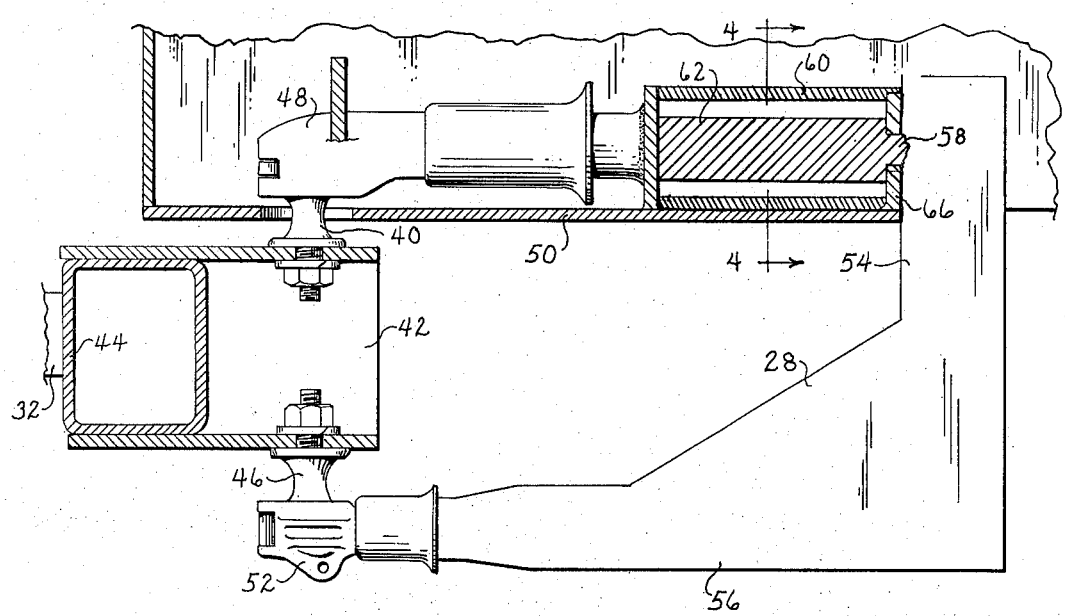
FIG. 3 is a sectional view taken substantially along line 3—3 of FIG. 2.

DESCRIPTION OF THE PREFERRED EMBODIMENT:

Referring to the drawing, there may be seen a running gear according to this invention. This running gear has back axle 10 having wheels 12 journaled thereto with crank arm springs. Journaling rotatable wheels to the axle by crank arms for the spring effect is well known to the art and units are commercially available; therefore, they are not further described here.

Front axle 14 also has rotatable wheels 16 journaled thereto by crank arms.

Tongue 18 is biforcated so it has two arms 20 which are pivotly attached to the front axle 14. The front axle and rear axle are connected by reach structure 22. As illustrated, the reach structure includes the two beams 24 which are rigidly attached to rear bolster 26 which is rigidly attached to the rear axle 10. It is contemplated that any type reach structure could be used, e.g., a single reach pole could be used or a tank or other body could be rigidly attached to the rear bolster 26.

At the forward end of the reach structure, bracket 28 joins the reach structure 22 to the front axle 14 so the front axle may swing about a vertical axis.

What has been described above is conventional and well known to the art before my invention although I change the exact structure of the bracket 28.

I attach the tongue 18 to the front axle 14 by two ball units 30. These ball units 30 are each attached to ears 32 which project forward from front bolster 44 rigidly attached to the front axle 14. As illustrated, the ball units 30 extend outward from the ears 32. The ball units 30 are horizontally aligned.

Socket 34 is attached to each of the arms 20 of the tongue 18. The sockets 34 are over the ball units 30 forming a snug joint. Each of the sockets 34 is provided with grease fitting 36 so the joints are readily lubricated. Furthermore, the sockets 34 are of the type that are hinged together at the forward edge and are split at the back with a tapered cone-like structure. Sleeve 38 slides over the tapered elements and is spring biased toward the ball. Therefore, as wear between the socket and ball occurs, the spring urges the sleeve 38 toward the ball upon the cone to force the elements of the socket together so there is always a snug fit formed between the sprocket 34 and the ball unit 30. Ball socket joints of this type are known as "bulldog" sockets and are commercially available on the market. In fact, I prefer to buy the commercially available sockets and weld them to the arms 20.

The top ball unit 40 is attached to the top of hanger 42 which projects behind the front bolster 44 which is rigidly attached to the front axle 14. Bottom ball unit 46 is attached to depend from the bottom of the hanger 42. The top and bottom ball units 40 and 46 are vertically aligned. Therefore, the front axle swings about the vertical axis defined by the top and bottom ball units.

Top socket 48 is attached to the horizontal plate portion 50 of the bracket 28 which is the forward portion of the reach structure ss. It is also of the bulldog type, but of slightly different construction inasmuch as it has a solid top to increase the bearing properties thereof. It will be noted that the entire weight of the load as carried by the front axle 14 rests primarily upon the top socket 48 and the top ball unit 40 although the ball unit 46 with bottom socket 52 carry some weight. The top socket is also of the bulldog type and is commercially on the market, is purchased as a unit and welded to the plate 50. As may be seen in FIG. 3, the bracket 28 is basically C-shaped, having vertical leg 54 and a horizontal foot 56. As the sockets are customarily oriented, the bottom socket is "upside down".

As described to this point, it may be seen that the front axle is pivoted to the reach structure about a vertical axis and that the joints will be always snug because of the bulldog type socket joints over the balls.

It is desirable that the front axle also be pivoted about a horizontal axis so it "rocks." I.e., in traversing rough terrain, as is customary with agricultural tractors going over ditches or terraces, one front wheel can be considerably elevated or depressed from the other while the rear wheels are level. This is highly desirable. Therefore, to accommodate this, it is necessary to permit the top and bottom sockets to move laterally with respect to one another, however, they must not be permitted to move forward or back with respect to one another. It may be seen that if they are permitted to move forward or back with respect to one another, the front axle will either be pulled up from under the trailer or will fold back under the trailer.

Therefore, the top socket and bottom socket 48 and 52 are permitted to move laterally of the trailer, but not to the forward and rear of the trailer. It is pointed out that even when the front axle is swung a full 90°, the bracket does not permit any forward or back motion and, therefore, the front wheels 16 cannot bind against the reach structure 22. If this were permitted to happen, damage would almost surely result to the trailer because the pressure of the wheel against the reach structure as the wheel rotates causes the reach structure to capsize.

Figure 4:
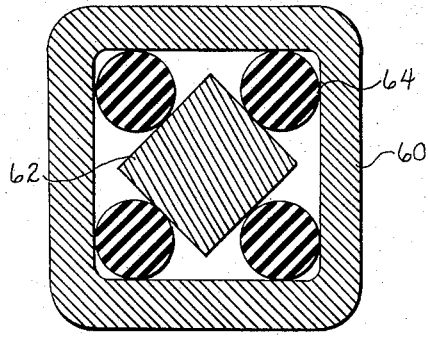
FIG. 4 is a sectional view taken substantially along line 4—4 of FIGS. 2 and 3.

I accomplish this rocking or lateral movement by mounting the vertical leg 54 to a horizontal shaft 58 which is aligned with the draft of the vehicle, i.e., it is aligned with the reach structure 22. The shaft 58 is mounted by torsional restraints within tube 60 which is securely attached as by welding to the plate 50. I prefer to make this attachment by having a diamond 62 shape portion of the shaft 58 within square portion of the tubes 60 and four rubber cylinders 64 in the corners as illustrated in FIG. 4. The rear end of the tube 60 is closed by a plate 66 which has a hole therein. The shaft 58 has a round section between the diamond 62 and the vertical leg 54 so that forward and rear motion of the shaft 58 and, therefore, the C-shaped bracket is not permitted. Therefore, it may be seen that the top socket 48 on the plate 50 and the bottom socket 52 on the foot 56 are always maintained in vertical alighment and they are not permitted to move forward and aft of one another. However, certain lateral movement of the sockets are permitted, inasmuch as the joints between the top socket 48 and the top ball unit 40 and bottom socket 52 and bottom ball unit 46 are formed as described. It may be seen that the front axle may rock laterally, but may not rock forward and aft.

The embodiment shown and described above is only exemplary. I do not claim to have invented all the parts, elements or steps described. Various modifications can be made in the construction, material, arrangement and operation and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. On a trailer having
   a. a back axle, and
   b. a swinging front axle,
   c. rotatable wheels journaled to each axle,
   d. reach structure connecting the front and rear axle,
   e. a vertical joint between the swinging front axle and reach structure,
   f. a tongue, and
   g. a horizontal joint between the tongue and front axle;
   h. the improved structure comprising:
   j. at least one of said joints being constructed of
      i. ball units,
      ii. each ball unit having a socket over it forming a snug fit, and
         iii. spring means on each socket for keeping the socket snug and tight on said balls,
   k. whereby said joints are maintained free working and without slack and play which thus maintains good high speed towing characteristics of said trailer.
2. The invention as defined in claim 1 wherein
   k. both of said joints are ball socket joints.
3. On a trailer having
   a. a back axle, and
   b. a swinging front axle,
   c. rotatable wheels journaled to each axle,
   d. reach structure connecting the front and rear axle,
   e. a bracket between the swinging front axle and reach structure rigidly attached to the reach structure,
   f. a bifurcated tongue attached to the front axle,
   g. the improved structure for pivoting the tongue to the front axle comprising:
   h. balls attached to said front axle,
   j. sockets on the biforcation of the tongue on the balls, and
   k. spring means on the sockets for keeping the sockets tight on said balls,
   m. whereby said joint is maintained free working and without slack and play which thus maintains good high speed towing characteristics of said trailer.
4. On a trailer having
   a. a back axle, and
   b. a swinging front axle,
   c. rotatable wheels journaled to each axle,
   d. reach structure connecting the front and rear axle,
   e. a bracket between the swinging front axle and reach structure rigidly attached to the reach structure,
   f. a tongue attached to the front axle;
   g. the improved structure for swingingly mounting the front axle to said bracket comprising:
   h. a top ball attached to the axle,
   j. a socket attached to the bracket around the top ball,
   k. spring means on said socket for keeping the socket tight on said top ball, and m. second pivot means vertically aligned with said ball.

5. The invention as defined in claim 4 with an additional limitation of
   n. said top ball and socket being substantially in line with said front axle.

6. The invention as defined in claim 4 wherein
   n. said second pivot means also includes a bottom ball socket joint.

7. The invention as defined in claim 6 wherein said bracket includes
   o. spring means for permitting the bottom ball socket joint to move laterally of the top ball socket joint, but said spring means preventing the bottom ball socket joint from moving forward and rearward of said top ball socket joint.

8. The invention as defined in claim 7 wherein said spring means includes
   p. a square tube rigidly attached to said top socket and aligned with the direction of draft,
   q. a diamond shaped shaft in said square tube,
   r. rubber cylinders in the tube in the corners around the shaft,
   s. said shaft rigidly attached to said bottom socket, and
   t. said bottom socket around the bottom ball which is on said axle.

9. The invention as defined in claim 8 with additional limitations of
   u. tongue balls attached to said front axle,
   v. tongue sockets on the biforcation of the tongue on the tongue balls, and
   w. spring menas on the tongue sockets for keeping the tongue sockets tight.

10. The invention as defined in claim 9 with additional limitations of
   x. a front bolster rigidly attached to the front axle,
   y. ears projecting forwardly of said bolster,
   z. said tongue balls attached to said ears,
   aa. a hanger attached to the rear of said front bolster,
   bb. said top and bottom balls attached to said hanger.

11. On a trailer having
   a. a back axle, and
   b. a swinging front axle,
   c. rotatable wheels journaled to each axle,
   d. reach structure connecting the front and rear axle,
   e. a vertical joint between the swinging front axle and reach structure,
   f. a tongue, and
   g. a horizontal joint between the tongue and front axle;
   h. the improved method of making at least one of said joints comprising:
   j. pivoting the parts of the joint together with two aligned ball and socket joints, and
   k. spring biasing parts of each socket toward the ball so as to maintain them tight.

* * * * *